April 4, 1950

C. E. JAHNIG 2,502,953

PROCESS AND APPARATUS FOR CONTACTING
SOLID PARTICLES AND GASEOUS FLUID

Filed March 9, 1946

INVENTOR
CHARLES E. JAHNIG.

BY George J. Silhavy
ATTORNEY

April 4, 1950

C. E. JAHNIG

2,502,953

PROCESS AND APPARATUS FOR CONTACTING
SOLID PARTICLES AND GASEOUS FLUID

Filed March 9, 1946

INVENTOR
CHARLES E. JAHNIG,
BY George J Silhavy
ATTORNEY

Patented Apr. 4, 1950

2,502,953

UNITED STATES PATENT OFFICE 2,502,953

PROCESS AND APPARATUS FOR CONTACTING SOLID PARTICLES AND GASEOUS FLUID

Charles E. Jahnig, Roselle, N. J., assignor to Standard Oil Development Company, a corporation of Delaware Application March 9, 1946, Serial No. 653,422

15 Claims. (Cl. 196—52)

This invention relates to contacting solid particles and gaseous fluids, and more particularly relates to stripping or purging catalyst or contact particles to remove volatile material therefrom.

In many operations where solid particles are contacted with gaseous fluids it is important to strip the particles to remove gaseous fluid before reusing the solid particles or before regenerating them. In the catalytic conversion of hydrocarbons the catalyst or contact particles become contaminated or fouled with carbonaceous material or coke and the particles are regenerated by burning with air or other oxygen containing gas to remove the carbonaceous material. Before regenerating it is necessary to strip or purge the solid particles to remove volatile hydrocarbons admixed with the particles so that the load on the regenerator is reduced.

Regenerated catalyst may also be purged or stripped to remove entrained oxygen-containing gas following a regeneration step.

The gaseous fluid associated with the solid particles may be within the pores of the particles or between the individual particles and my invention is primarily concerned with the stripping of the gaseous fluid between the individual particles. The bulk density of the catalyst in the aerated condition together with the temperature and pressure are the major variables determining the amount of strippable gaseous fluid carried by the solids, but it also depends on the skeleton density of the solid.

The amount of strippable gaseous fluid associated with the solid particles entering the stripping zone is the volume of gas which must be stripped out. This determines the degree of stripping required when considered in conjunction with the efficiency of removal required. The fluid bed density of a finely divided material is related to the size and density of the particles, but for a given material and aerating gas it depends upon the velocity of the gas rising through the bed. Thus at very low gas velocity the concentration will be high, approaching that of the unaerated material. As the gas velocity is increased the bed density will decrease and may be only a fraction of the unaerated density. This feature is utilized to advantage in the present invention.

According to one form of my invention solids to be stripped or purged are withdrawn from a zone in a dense fluidized liquid-simulating condition and passed to a first concentrating and stripping zone to concentrate the dense fluidized mixture to a higher density mixture before the mixture passes to the next stripping zone wherein the mixture is aerated to a higher degree and a less dense mixture results. These stages are repeated as desired to effect better stripping of the solids.

With my aeration de-aeration process it is possible to reduce the amount of strippable gaseous fluid carried into the stripping zone. In the above mentioned concentrating zone part of the gaseous fluid between the solid particles is squeezed out and removed by the concentration or de-aeration effect. In many fluid catalyst or contact processes, as, for example, catalytic cracking, the de-aeration in the concentrating step will reduce the amount of gaseous fluid entering the next stripping stage by about 50% so that adequate stripping is more easily obtained. Further, when using de-aeration zones between each of several stripping aeration stages the effect is further magnified so that it is possible to reduce the amount of stripping gas and the number of steps required to attain the desired efficiency of stripping.

In the concentrating or de-aeration zones little or no stripping gas is introduced so that the bulk density of the mixture of solid particles is increased, whereas a relatively higher gas velocity is used in the several stripping zones and consequently the bulk density of the catalyst is lower in such stripping zones.

Different forms of apparatus are shown for practicing my invention.

Figure 1:
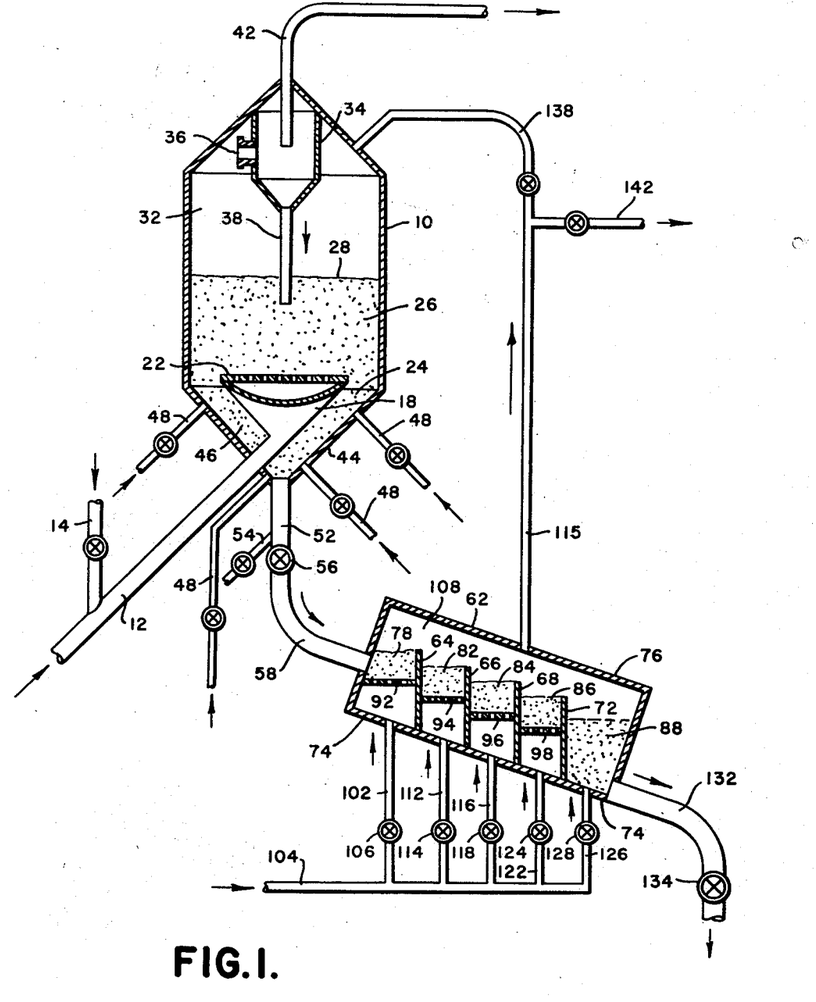
Fig. 1 represents a vertical cross sectional view of one form of apparatus adapted to carry out my invention.

Referring now to the drawings, and more particularly to Fig. 1, the reference character 10 designates a contacting zone provided with an inlet 12 for introducing gaseous fluid and solid particles into the contacting zone 10. A portion of a standpipe is shown at 14 for introducing solid particles into the inlet line 12 for admixture with the gaseous fluid passing through line 12. The gaseous fluid containing the solid particles is introduced into an inverted conical feed member 18 provided at its upper end with a horizontal perforated distribution plate member 22 for distributing the gaseous fluid and the solid particles evenly across the area of the contacting zone 10.

The inverted conical feed member 18 is arranged in the lower part of the contacting zone 10 and is spaced from the inner walls of the contacting zone to provide an annular space 24 for withdrawal of the solid particles as a dense mixture from the contacting zone 10. Preferably the contacting zone 10 is cylindrical and the plate member 22 is circular and concentric with the contacting zone 10.

While my invention may be used with processes generally in which solid particles are contacted with gaseous fluid, it will be more particularly described in connection with the catalytic cracking of hydrocarbons. The hydrocarbons feed may comprise vaporized or liquid hydrocarbons such as gas oil, heavy or light naphtha, etc., or may comprise preheated reduced crude oil. Where the hydrocarbon feed is only partly preheated, the heat of vaporization and cracking is supplied by using a sufficient amount of hot regenerated catalyst.

The velocity of the hydrocarbon vapors passing upwardly through the conversion zone 10 is selected to maintain the catalyst particles in a dense fluidized liquid-simulating turbulent condition shown at 26 having a level indicated at 28 with a dilute or less dense suspension thereabove indicated at 32. The superficial velocity of the gaseous fluid (the velocity of the gas in a vessel free of solids) is between about 0.2 ft. per sec. and 2.0 ft. per sec., preferably 0.5 to 1.5 ft. per sec.

In the catalytic cracking of hydrocarbons the cracking catalyst may comprise acid treated bentonite clays, synthetic silica alumina gels, synthetic silica magnesia gels, etc. The catalyst may be a ground material in finely divided condition with the particles being of a size between about 200 and 400 standard mesh and having up to about 30% of 0 to 20 micron particles. With spherical particles satisfactory fluidity can be maintained with considerably coarser materials.

In the catalytic conversion of hydrocarbons the temperature may be between about 800° F. and 1050° F. For example, in the catalytic cracking of hydrocarbons the temperature may be between about 900° F. and 1000° F. When using acid treated bentonite clays or synthetic silica alumina gels of the above described size the density of the fluidized mixture 26 in the conversion zone 10 is about 15 lbs. per cu. ft. to 40 lbs. per cu. ft. depending on the velocity of the gaseous fluid selected, as well as on the density and particle size of the catalyst.

The vapors passing upwardly through conversion zone 10 entrain some solid particles as they pass into the upper less dense suspension zone at 32 and in order to remove the entrained particles the vapors are passed into separating means 34 having an inlet at 36. The separating means 34 is shown as a cyclone separator arranged in the upper part of the conversion zone or vessel 10. Other forms of separating means may be used and if desired the separating means may be arranged outside of the vessel 10. Also, one or more cyclone separators or other separating means may be used and where more than one separator is used they may be arranged in series.

In the separating means 34 most of the entrained solid particles are separated from the vaporous reaction products, the separated particles being returned to the dense mixture 26 by dip pipe 38. The vaporous reaction products pass overhead through line 42 and are preferably passed to a fractionating tower for separating desired products, such as gasoline, from higher boiling hydrocarbons.

During the catalytic conversion of hydrocarbons the catalyst particles become contaminated or fouled with coke or carbonaceous material and before reusing them in another conversion operation it is necessary to regenerate them, as, for example, by burning the carbonaceous deposits from the catalyst particles in a separate regeneration zone. Before regenerating the catalyst or contact particles it is preferred to strip out volatile hydrocarbons from the fouled or contaminated catalyst particles.

The stripping of fouled or spent catalyst particles in processes where the catalyst particles are withdrawn in a dense fluidized condition has not been as efficient as desired. My invention sets forth an improved process for stripping spent or contaminated catalyst or contact particles withdrawn from a conversion zone in a dense fluidized condition.

The vessel 10 is provided with a conical bottom 44 which forms a withdrawal space or passageway 46 with the bottom portion of the conical feed member 18. Stripping or fluidizing gas is introduced into passageway 46 through lines 48 to maintain the hot fouled solid particles in a fluidized condition as they are withdrawn from the reaction zone and a sufficient amount of fluidizing gas may be used to effect some stripping in the passageway 46. The stripping gas passes up into zone 32 and out through line 42.

The dense fluidized particles are introduced into the upper portion of a standpipe 52 provided with a line 54 for introducing fluidizing gas into the standpipe 52 for maintaining the particles in a dense fluidized liquid-simulating condition so that they build up or produce a hydrostatic pressure at the base of the standpipe.

The standpipe is provided with a control valve 56 for controlling the rate of withdrawal of the solid particles from the vessel 10. The withdrawn contaminated particles contain entrained volatile material and the particles are stripped to remove as much of this volatile material as possible.

The spent or contaminated particles are passed through line 58 to a stripping vessel generally indicated at 62. The stripping vessel is a stationary vessel and is shown as being arranged in an inclined position. The dense fluidized particles are introduced into the higher end of the vessel 62 so that the general flow of the particles is downwardly toward the other end of the stripping vessel 62. The vessel 62 may be of any shape or form but is preferably of a rectangular or cylindrical shape.

The vessel 62 is provided with spaced vertical partitions 64, 66, 68 and 72 extending upwardly from the bottom 74 of the stripping vessel 62 but having their upper ends spaced from the top 76 of the stripping vessel 62. These partitions extend across the entire width of the stripping vessel 62 to form zones or chambers 78, 82, 84, 86 and 88. The chambers 78, 82, 84 and 86 are provided in their lower portion with horizontal perforated partitions 92, 94, 96 and 98, respectively, for introducing stripping or aerating gas into the chambers. If desired, other distribution means may be used such as bubble caps, spray rings, etc.

The fluidized solid particles to be stripped are passed through line 58 into the first chamber 78 above the perforated ember 92 therein. The chamber 78 forms a concentrating or de-aeration chamber in which little or no aeration gas is introduced. If necessary to maintain the particles in fluidized condition, fluidizing or striping gas may be introduced through line 102 which communicates with the space below perforated partition 92 in chamber 78. Line 102 communicates with a main distributing line 104 and is provided with a valve 106 for regulating the amount of fluidizing and stripping gas introduced into the chamber 78.

In the concentrating zone 78 when a fluidizing gas is necessary a lower gas velocity is used and is preferably between about .02 to .5 ft. per second.

As above pointed out the dense mixture 26 of solid particles in the reaction zone 10 has a density of about 15 lbs. per cu. ft. to about 40 lbs. per cu. ft. when employing the type of cracking catalyst above described. The dense fluidized mixture withdrawn from the bottom of the vessel 10 through passageway 44 may have the same density as that of the dense mixture 26 or it may have a lower or higher density. The de-aerated mixture in zone 78 is less turbulent than the mixture 26 and has a density of about 25 lbs. per cu. ft., to 60 lbs. per cu. ft., which may be appreciably more than the density of the mixture shown at 26 in the reaction vessel 10. In this zone 78 the fluidized mixture is de-aerated or de-gassed and volatile material such as hydrocarbons are squeezed out of the mixture and passed into the space 108 above the tops of partitions 64, 66, 68 and 72 in the upper portion of the stripping vessel 62.

The solid particles in chamber 78 are maintained as a fluidized mixture and when a sufficient amount of solids accumulate in the zone 78 the mixture overflows the top of the first vertical partition 64 and flows into the next zone 82 into which stripping gas is introduced and the fluidized mixture is aerated to a lower density than that existing in the de-aeration zone 78. Line 112 having valve 114 introduces stripping gas into the space below the perforated partition 94 in chamber 82. The density of the mixture in the stripping zone 82 is much less than that it the concentrating chamber or zone 78 and has a density of about 10 lbs. per cu. ft. to 40 lbs. per cu. ft.

In order to reduce the density of the mixture in the stripping zone 82 the superficial velocity of the stripping gas passing upwardly through zone 82 is between about 0.5 and 2.0 ft. per second.

It will be noted that a dilute phase is maintained above the catalyst levels in 78, 82, 84, 86 and 88; that is, the level of dense catalyst is not allowed to reach the top of vessel 62 or outlet 115. This is done to minimize entrainment of catalyst by the gases leaving through line 115. A distance of from 2 to 5 ft. will ordinarily be satisfactory and the gas velocity should not be much above 1.5 ft. per second in the dilute phase.

Instead of using valves in the stripping gas lines 102 and 112 the amount of stripping gas being introduced into the respective zones 78 and 82 may be controlled by proper selection of the number or size of openings in the perforated partitions 92 and 94, for example, fewer holes, smaller holes or no holes may be used in the first perforated partition 92 than are used in the second perforated partition 94. The partitions 96 and 98 may be similarly constructed; that is, partition 96 may be constructed like partition 92 and partition 98 like partition 94.

The stripping gas is preferably steam but because of its deactivating effect on certain catalysts, other stripping gases such as nitrogen, carbon dioxide, methane, ethane, etc. may be used.

From the stripping chamber 82 the particles in a fluidized condition overflow the top of the vertical partition 66 into the next zone or chamber 84 which again is a de-aeration or de-gassing zone. Volatile material is squeezed out from between the particles and the density of the fluidized mixture is increased to about 25 lbs. per cu. ft. to about 60 lbs. per cu. ft. The superficial velocity in zone 84 of the aerating or stripping gas introduced through line 116 having valve 118 is about .02 to .5 ft. per second.

The more dense mixture from zone 84 overflows the upper part of the next vertical partition 68 and into the next chamber or zone 86 which again is a higher velocity zone whereby the dense mixture is aerated to a lower density than that existing in the next preceding de-aeration zone 84. In the stripping zone 86 the less dense mixture has a density of about 10 lbs. per cu. ft. to 40 lbs. per cu. ft.

Aerating or fluidizing gas is introduced into chamber 86 below perforated partition 98 through line 122 having valve 124.

From the stripping zone or chamber 86 the dense mixture overflows the top of the next vertical partition 72 and the fluidized mixture accumulates in the end zone 88 wherein it is maintained in a fluidized condition by fluidizing gas introduced through line 126 having a valve 128. The stripped catalyst or contact particles are withdrawn from the bottom of the chamber 88 through line 132 having a control valve 134 which may be used to regulate the level of material in zone 88. The stripped particles are then passed to a regeneration zone (not shown) which may be of the same construction as that of reaction vessel 10. During regeneration the solid particles are preferably maintained in a dense fluidized condition having a level with a dilute suspension thereabove.

The stripping vessel 62 is provided in its upper wall 76 with outlet line 115 for conducting stripping gas and stripped out material from the space above chambers 78, 82, 84, 86 and 88 in stripping vessel 62. As the gaseous fluid withdrawn through line 115 contains entrained solids it is preferred to return the gaseous fluid through line 138 to the upper portion of the reaction vessel 10 above the level 28 of the dense mixture therein. Returning this gas to the vessel 10 near the top of dilute phase 32 allows treating the gas in separator 34 for recovery of solids, while at the same time a low velocity is maintained in zone 32 as required for efficient separation of catalyst. However, the gaseous fluid may be withdrawn through line 142 and passed to the fractionating equipment, to a condenser or to other recovery equipment.

The lines 112, 116, 122 and 126 communicate with the main line 104 which supplies fluidizing and stripping gas to the stripping vessel 62.

In some cases it may be possible to design the reactor removal zone 46 and standpipe 52 so that the material introduced into vessel 62 through line 58 is at a relatively high density, comparable to that which would be desired for de-aeration zone 78. In this event the initial de-aeration zone 78 may be omitted.

Figure 2:
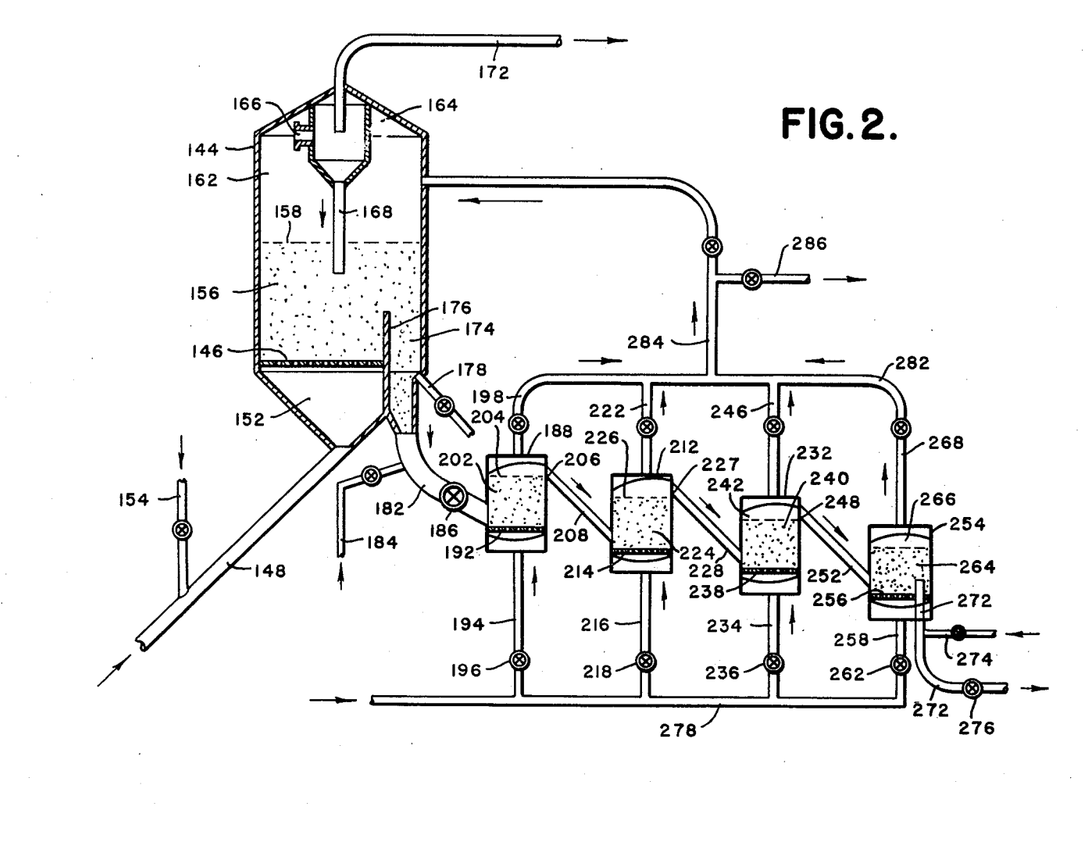
Fig. 2 is a vertical cross sectional view of another form of apparatus adapted to carry out my invention.

Referring now to Fig. 2, the reaction vessel is of slightly different construction from that shown in Fig. 1 and a modified stripping section is shown. The vessel 144 is provided with a horizontal bottom perforated distribution plate 146. An inlet 148 is provided for introducing gaseous fluid and solid particles into the conical space 152 below the distribution member 146. Solid particles are introduced into the inlet line 148 from standpipe 154 or other means.

The superficial velocity of the gaseous fluid passing up through the vessel 144 is selected to maintain the solid particles in a dense fluidized condition shown at 156 with a level at 158 and a dilute phase or dilute suspension 162 thereabove. The vessel is also provided with a separating means 164 having an inlet at 166. Separated solids are returned to the dense bed through dip pipe 168 and vaporous reaction products pass overhead through line 172.

A withdrawal well 174 is formed between the lower portion of the inner wall of the vessel 144 and vertical partition 176 which preferably extends across vessel 144. The upper portion of the partition 176 is below the level 158 of the dense mixture. Fluidizing gas is introduced into the bottom portion of the well through line 178. A dense fluidized mixture is introduced into a standpipe 182 provided with one or more fluidizing lines 184 and control valve 186.

The dense fluidized mixture is then passed to a stripping section which is of slightly different construction from that shown in Fig. 1. The dense fluidized mixture is passed to a first concentrating or de-aeration chamber 188 provided with a horizontal perforated plate 192 below which fluidizing gas is introduced through line 194 having valve 196. The fluidized mixture is introduced into the chamber 188 above the perforated partition 192.

In the reaction or conversion vessel 144 the superficial velocity of the vapors or other gaseous fluid passing upwardly through the vessel is between about 0.2 ft. per second and 2.0 ft. per second and the density of the mixture in the catalytic conversion of hydrocarbons is about the same as above described in connection with the dense mixture in reaction vessel 10. In the withdrawal well 174 the density of the fluidized mixture may be between about 10 lbs. per cu. ft. and 40 lbs. per cu. ft.

In the de-aeration chamber 188 the mixture has its bulk density increased to about 25 lbs. per cu. ft. to 60 lbs. per cu. ft. and this de-aeration results in squeezing out volatile material from between the particles and effects removal of a large part of the volatile material from the contaminated catalyst particles. The de-aeration chamber 188 is provided with a gas outlet 198 for removing stripping gas and volatile material from the upper portion of the chamber 188. In the de-aeration chamber 188 the solid particles are maintained as a dense fluidized mixture shown at 202 with a level at 204.

The de-aeration chamber 188 is provided with an outlet 206 for solids near the upper portion thereof for withdrawing de-aerated dense fluidized particles from the upper portion of chamber 188 and for passing them downwardly through inclined pipe or line 208 to the next chamber 212 which is a low density stripping chamber. The dense mixture is introduced above the horizontal perforated partition 214 and is stripped by stripping gas introduced through line 216 having valve 218. The stripping gas is introduced below the partition 214. Chamber 212 is provided with a gas outlet line 222 leading from the upper portion of the second chamber 212.

In the stripping chamber 212 the particles are maintained in a dense fluidized condition 224, having a level at 226. In this stripping chamber 212 the dense mixture is aerated to a lower density than that existing in the de-aerating chamber 188. The density of the mixture is between about 10 lbs. per cu. ft. and 40 lbs. per cu. ft. The stripping chamber 212 may be arranged at a slightly lower level than the de-aeration chamber 188 to facilitate downward flow of fluidized solids.

The stripping chamber 212 has an outlet 227 arranged near its upper portion for withdrawing dense fluidized solids from the stripping chamber 212 and for passing them through line 228 to another de-aeration chamber 232 which is similar in construction to the first mentioned de-aeration chamber 188. The de-aeration chamber 232 may be arranged at a slightly lower level than the stripping chamber 212. Stripping gas is introduced into the bottom of the de-aeration chamber 232 through line 234 having valve 236. The chamber 232 has a horizontal perforated partition 238 arranged below the lower outlet end of line 228.

The particles in the de-aeration chamber 232 are maintained as a relatively dense mixture shown at 240, having a level at 242. The density of the mixture in this chamber 232 is about 25 lbs. per cu. ft. to 60 lbs. per cu. ft. The chamber 232 has a top outlet line 246 for removing stripping gas and volatile material removed from between the solid particles.

The chamber 232 has an outlet 248 for solids near its upper portion for communicating with the downwardly extending pipe 252 for conducting the dense fluidized mixture into the lower portion of the next lower stripping zone 254. The stripping chamber 254 has a horizontal perforated partition 256 below the outlet end of the inclined pipe 252. Stripping gas is introduced below the partition 256 through line 258 having a valve 262. The solid particles are stripped and aerated at a lower density in the stripping chamber 254, the dense mixture being shown at 264 having a level at 266. Stripping gas and stripped out material are withdrawn from the top of the stripping chamber 254 through line 268.

Fluidizing gas may be introduced into lines 208, 228 and 252 for maintaining the solids therein in fluidized condition. If vessels 188, 212, 232 and 254 are at the same level, the flow of solids is obtained by having the fluidized mixture in lines 208, 228 and 252 of sufficient density to produce the necessary hydrostatic pressure to pass the mixture to the next vessel.

In the stripping chamber 254 the mixture is maintained at a density of between about 10 lbs. per cu. ft. and 40 lbs. per cu. ft.

The stripped dense fluidized material is withdrawn from the lower portion of the dense mixture 264 through standpipe 272 provided with one or more fluidizing lines 274 and a control valve 276. The stripped solid particles are then passed to a regeneration zone (not shown) for regenerating the particles. Where the particles are used in an absorption process or in other processes where regeneration is not necessary, the stripped particles may be returned to the contacting zone 144. In such a case it will be preferable to treat the effluent gases passing through line 284 separately rather than returning them to the reactor as shown.

Main line or distributing line 278 feeds the stripping and aerating lines 194, 216, 234 and 258. The outlet lines 198, 222, 246 and 268 communicate with a single line 282 and as this gaseous stream contains entrained solid particles it may be passed through line 284 into the upper portion of contacting vessel 144 for passage through the separating means 164. If desired, the gaseous stream may be withdrawn from the system through line 286 and passed to the fractionating equipment, to a condenser or to additional recovery equipment. In any event the streams leaving zones 188, 212, 232 and 254 through lines 198, 222, 246 and 268 may be treated separately rather than being combined as shown.

In the de-aeration chambers 188 and 232 the superficial velocity of the upflowing stripping gas is about .02 to .5 feet per second, whereas in the stripping chambers 212 and 254 the superficial velocity of the gas may be between about .5 and 2.0 feet per second.

Figure 3:
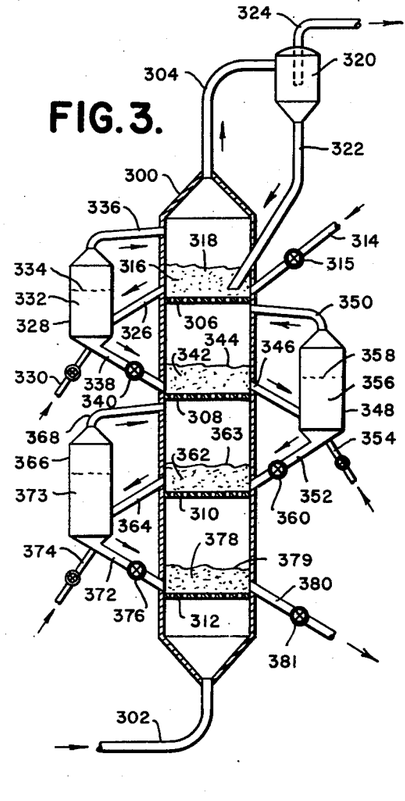
Fig. 3 represents a vertical cross sectional view of a stripping tower in which the stripping zones are arranged one above the other in spaced relation and the concentration or de-aeration zones are outside of the stripping tower.

Referring now to Fig. 3 I have shown a stripping tower or vessel 300 in which the stripping zones are arranged one above the other in spaced relation and de-aeration zones or chambers are arranged outside the stripping vessel. The stripping vessel 300 has a bottom inlet 302 for stripping gas and a top outlet 304 for stripping gas and stripped out volatile material. The vessel is provided with spaced perforated partitions arranged horizontally one above the other in spaced relation and they are shown at 306, 308, 310 and 312. The vessel 300 is provided with an inlet line 314 having valve 315 and having its outlet above the top perforated partition 306. This line 314 conducts the dense fluidized catalyst or contact particles from a contacting zone such as zone 10 in Fig. 1 and 144 in Fig. 2. My invention is especially adapted for the stripping of dense fluidized mixtures and may be used in connection with hoppers or with other types of contacting vessels than those shown in Figs. 1 and 2.

The stripping gas passing upwardly through the stripping vessel 300 maintains the solid particles in a dense fluidized condition on each of the partitions. For example, on partition 306 the solid particles are maintained in a dense fluidized condition shown at 316 having a level similar to a liquid at 318. The gaseous fluid passing out of the top of the stripping vessel 300 through line 304 is preferably passed to a separating means 320 and the separated solids are returned to the dense mixture 316 through line 322. The separated gaseous fluid passes overhead through line 324 and may be passed to the fractionating equipment, to a condenser or to additional recovery equipment for recovering solids from the gaseous fluid.

In a catalytic cracking operation the density of the fluidized mixture 318 comprising spent catalyst to be stripped may be between about 10 lbs. per cu. ft. and 40 lbs. per cu. ft. The superficial velocity of the stripping gas passing through the dense bed or mixture 316 may be between about 0.5 ft. per second and 2.0 ft. per second.

Above the perforated partition 306 the vessel 300 has a downwardly extending withdrawal line 326 for withdrawing the fluidized mixture from above the partition 306 and for passing it to a de-aeration or de-gassing chamber 328 located outside vessel 300. Aeration or stripping gas is introduced into the lower portion of chamber 328 through line 330. In the chamber 328 the particles are maintained as a dense fluidized mixture shown at 332 with a level shown at 334. Line 326 empties into chamber 328 below level 334. The superficial velocity of the stripping or aerating gas is between about .02 and .5 ft. per second and the density of the fluidized mixture 332 is between about 25 lbs. per cu ft. and 60 lbs. per cu. ft. This de-aeration zone is similar in its operation to the de-aeration zones above described in connection with Figs. 1 and 2.

Stripping gas and stripped out material leave the top of the chamber 328 through line 336 and may be returned to the upper portion of the stripping vessel 300 above the level 318 of the dense mixture 316 on partition 306, and this is convenient because it has about the same composition as the gas leaving the stripping vessel through line 304. However, if desired, the gaseous fluid withdrawn through line 336 may be passed to fractionating equipment, to a condenser or additional recovery equipment.

The de-aerated dense mixture is withdrawn from the bottom of the concentrating zone or chamber 328 through inclined pipe 338 having a control valve 340. Instead of valve 340 a fixed orifice of proper size may be used. The inclined pipe or line 338 discharges the dense fluidized mixture into the stripping vessel 300 above the next lower perforated partition 308. The stripping gas passing upwardly through the stripping vessel maintains the particles above the partition 308 as a fluidized mixture 342 having a level at 344. The superficial velocity of the stripping gas passing through the fluidized mixture 342 is between about .5 and 2.0 ft. per second and the fluidized mixture has a density of about 15 lbs. per cu. ft. to 40 lbs. per cu. ft. From this it will be seen that the dense fluidized mixture 342 has a lower density than that of the dense mixture in the de-aeration chamber 328.

The stripping vessel 342 is provided with a downwardly inclined pipe or line 346 which communicates with the dense mixture 342 above the perforated partition 308 for withdrawing dense fluidized mixture from above the perforated plate 308. The outlet end of the line 346 communicates with another external de-aeration chamber 348 similar in its operation to that of chamber 328 and provided with a top outlet 350 for gaseous fluid and a bottom inclined outlet 352 for withdrawing dense fluidized solids. Stripping and aerating gas is introduced into the bottom of the de-aeration chamber 348 through line 354 and maintains the particles in a dense mixture shown at 356 with a level at 358. The velocity of the gas and the density of the mixture in chamber 348 are substantially the same as those given in connection with the first de-aeration chamber 328.

The downwardly inclined line 352 is provided with a control valve 360 or fixed orifice as above described in connection with valve 340 for controlling the rate of withdrawal of solid particles from the chamber 348. The inclined line 352 conducts dense fluidized solids into a lower portion of the stripping vessel 300 above the next lower perforated partition 310. The superficial velocity of the gas passing upwardly through dense bed 362 having level 363 is about the same above described in connection with the dense bed 342 on the next higher partition 308. Also the density of the mixture is about the same as the density of the mixture 342 on partition 308.

From the dense bed 362 above partition 310 the stripping vessel 300 is provided with a downwardly extending pipe 364 for passing the dense fluidized particles into another external de-aeration chamber 366 having a top outlet 368 for gaseous fluid and a bottom outlet line 372 for fluidized solids. Stripping gas is introduced into the bottom of the chamber 366 through line 374. The outlet line 372 extends downwardly at an angle and introduces the dense mixture into the stripping vessel 300 above the lowermost perforated plate 312 therein. Line 372 has a control valve 376.

On the perforated plate 312 the particles are maintained in a dense fluidized condition as shown at 378 having a level indicated at 379 but the density of the mixture 378 is less than the density of the partly de-aerated mixture 373 in the de-aeration chamber 366. The de-aeration chamber 366 is similar in its operation to the operation of other de-aeration chambers above described. Likewise, the stripping of the solid particles on the lowermost perforated partition 312 is substantially the same as that above described in connection with the other mixtures on the perforated partitions.

The stripping vessel 300 is provided with a bottom outlet line 380 having valve 381 which communicates with the dense bed 378 on the lowermost perforated partition 312. The stripped particles are withdrawn from the lower portion of the bed or mixture 378 and may be regenerated in a separate regeneration zone (not shown) or may be returned to another contacting step if it is not necessary to regenerate the particles.

Lines 322, 314, 326, 338, 346, 352, 364, 372 and 380 may be provided with fluidizing or aerating lines for introducing gaseous fluids into the solids in these lines for maintaining the solids in fluidized and flowable condition.

With reference to the operation of valves 315, 340, 360, 376 and 381 one of these may be used to regulate the rate of catalyst flow through stripping tower 300 with the others used to maintain the proper bed depth above the partitions. For example, the flow rate may be set by valve 315 in which case valves 340, 360, 376 and 381 will be used to control the bed levels 318, 344, 363 and 379, respectively. Preferably, all these valves are automatically operated by well known means in order to insure optimum operation of the process.

In Fig. 3 the gas outlet lines 350 and 368 may lead back to the respective dilute phases above beds 342 and 362, respectively, in vessel 300 or they may be passed to fractionating equipment or other recovery equipment. However, returning the gases to tower 300 as shown allows omitting valves from these lines 336, 350, 368, which would otherwise be required for control.

Figure 4:
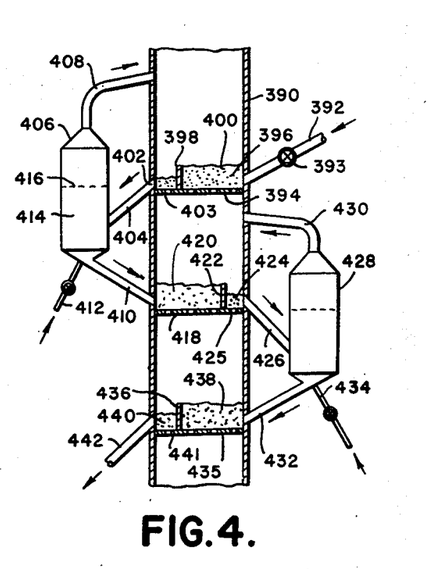
Fig. 4 represents a vertical cross sectional view of a portion of a modification of the stripping tower shown in Fig. 3.

Referring now to Fig. 4 I have shown a portion of a modified stripping tower or column in which valves are not needed for the lines leading from the bottom of the de-aeration chambers to the dense beds above the perforated partitions. Overflow weirs are used instead of valves to regulate the bed levels. The stripping vessel 390 is provided with an inlet line 392 having valve 393 for introducing fluidized solids above the perforated partition 394. The particles are maintained in a dense fluidized condition as shown at 396. Adjacent an inner wall of the stripping vessel 390 above the partition 394 is a vertical partition or weir 398 for maintaining a predetermined level 400 of dense fluidized solids on one side of weir 398.

The fluidized solids overflow the weir 398 and accumulate as a fluidized mixture as shown in 402 on the plate 394. The holes in this portion of plate 394, designated 403, are made smaller than in the rest of the plate 394 in order to prevent excessive bypassing of stripping gas through the low bed level in this zone. A downwardly extending line 404 conducts the fluidized mixture 402 to the lower portion of an external de-aeration chamber 406 having a top outlet 408 for gases and a bottom outlet 410 for fluidized solids. Aerating gas is introduced into the bottom of chamber 406 through line 412. The fluidized solids in the de-aeration chamber 406 are maintained as a dense mixture shown at 414 with a level at 416. It is essential that line 404 empty into chamber 406 below level 416 therein.

The velocity of the stripping gas passing upwardly through de-aeration chamber 406 and the density of the mixture therein are substantially the same as those described in connection with the de-aeration chambers in Fig. 3.

The de-aerated fluidized solids flow downwardly from chamber 406 through inclined line 410 and are returned to the vessel 390 above the next lower perforated partition 418. The particles are maintained in a less dense fluidized condition 420 on the perforated plate 418 than in chamber 406. The dense fluidized mixture overflows weir 422 on the perforated plate 418 and the particles accumulate as a fluidized mixture at 424 on the portion 425 on perforated plate 418 adjacent to the weir. This portion 425 is also provided with smaller holes than the ones in plate 418 for the reason above given in connection with portion 403 of plate 394.

The fluidized solid particles flow downwardly through inclined pipe 426 into another external de-aeration chamber 428 having a top outlet 430 for gases and a bottom inclined outlet 432 for fluidized solids. Line 426 empties into chamber 428 below the level of fluidized solids therein. An aeration line 434 is provided for fluidizing the particles in the de-aeration chamber 428. The particles flow from the outlet line 432 to the space above another lower perforated plate 435 provided with a weir 436. The gas passing upwardly through vessel 390 fluidizes the solid particles as a bed or mixture 438 which overflows the weir and accumulates at 440 on portion 441 of plate 435 having smaller holes than those in plate 435. A downwardly extending line 442 withdraws the fluidized material at 440 and passes it to the next de-aeration chamber.

Gas in line 408 may pass back to the vessel 390 above bed 396 and gas in line 430 may pass back to the vessel 390 above bed 420 whereby the proper pressures in vessels 406 and 428 are maintained. The vessels 406 and 428 will be under different pressures in the arrangement shown in Fig. 4.

The apparatus shown in Fig. 4 can be operated without valves by proper design of the apparatus. For example, the pressure above plate 394 will be less than below the plate 394 because of pressure drop obtained when passing the gaseous fluid upwardly through plates 394 and 403. The pressure at the bottom of fluidized bed 396 will be greater than the pressure above bed 396 due to pressure build-up of the fluidized solids. The pressure in chamber 406 above level 416 and in vessel 390 above level 409 will be the same.

The pressure at the bottom of bed 420 on plate 418 will be greater than at the bottom of the next higher bed 396 so that there must be a pressure build-up in chamber 406 and line 410 to cause the material to flow from chamber 406 to the bed on plate 418.

In a specific example specific dimensions and pressures will be given but it is to be understood that these are by way of illustration only and may be varied without digressing from my invention. Assume the pressure in vessel 390 above level 400 and the pressure in chamber 406 above level 416 to be about 15 lbs. per. sq. in. Then assume the pressure at the bottom of bed 396 on plate 394 in vessel 390 to be about 15.3 lbs. per sq. in. and the pressure below plate 394 to be about 15.8 lbs. per sq. in. The pressure at the bottom of the bed 420 on the next lower plate 418 will be about 16.1 lbs. per sq. in.

Therefore, in order to flow material from chamber 406 to plate 418 it will be necessary to build up the difference between 15 lbs. per sq. in. and 16.1 lbs. per sq. in. and this is done by selecting the proper height of fluidized solids in chamber 406. When using the finely divided material above described, the head or vertical height of fluidized solids having a density of about 30 lbs. per cu. ft. will be about 5.3 feet, the vertical height being measured from level 416 in chamber 406 to the top of perforated plate 418 in vessel 390.

Fluidizing lines may be provided for lines 392, 404, 410, 426, 432 and 442 for introducing fluidizing gas into the solids in the lines to maintain the solids in fluidized flowable conditions.

Figure 5:
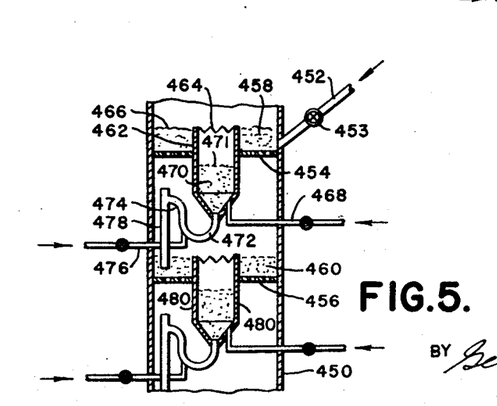
Fig. 5 is a vertical cross sectional view of a portion of a stripping tower in which the concentration or de-aeration zones are arranged within the tower.

In Fig. 5 the portion of the stripping vessel 450 shown includes inlet line 452 for fluidized solids having a valve 453 and perforated plates 454 and 456. In this form of my invention the de-aeration or concentrating chambers are located within the stripping vessel 450. The upflowing gas passing through the perforated plates maintains a level of fluidized solids 458 on plate 454 and a bed 460 on perforated plate 456. Extending upwardly through the center part of the perforated plate 454 is an internal de-aeration chamber 462 having an open upper end with a serrated edge, the upper edge of the chamber 462 acting as a weir and determining the level 466 of the fluidized bed 458 on the upper perforated plate 454.

The velocity of the stripping gas and density of the fluidized mixtures on plates 454 and 456 and de-aeration chamber 462 are substantially the same as above described in connection with the form of the invention shown in Figs. 3 and 4.

An aerating line 468 is provided for maintaining the particles as a dense fluidized bed 470 having a level at 471. The chamber 462 has a bottom outlet line 472 communicating with a vertical line 474. The outlet line 472 and the connected pipe 474 are in the shape of a U. Aerating gas is introduced through line 476 into the bottom portion of the leg 474. By varying the amount of gas introduced into line 474, the density of the mixture therein may be varied and as a result the rate of flow from vessel 462 may be varied.

The outlet end of the leg 474 discharges into a vertical pipe 478 which has its upper end open, communicating with the space below plate 454, and its lower end submerged in the fluidized bed 460 on the next lower plate 456. The dense fluidized mixture flows as such from line 474 directly into the upper part of pipe 478 and thence to bed 460, any gas which may be released being vented through the upper open end of pipe 478. The solids in pipe 478 will be at a level about the same as the level of bed 460.

With this construction it is not necessary to have a valve in the outlet line 472 for controlling the rate of withdrawal of solids from the de-aeration chamber. The proper bed levels are maintained by the overflow weirs, while the solids flow rate is set by control valve 453 in line 452.

As above pointed out in connection with Fig. 4, the pressure produced by the dense fluidized mixture 470 in Fig. 5 is utilized to introduce the fluidized solids into bed 460 on the next lower plate 456. The depth of bed 470 is selected to develop sufficient pressure to introduce the solids and gaseous fluid into tube 478 and into bed 460 on plate 456.

The next lower plate 456 is provided with a central opening through which extends the upper portion of another internal de-aeration chamber 480 which is similar in construction and operation to the de-aeration chamber 462 just described.

Figure 6:
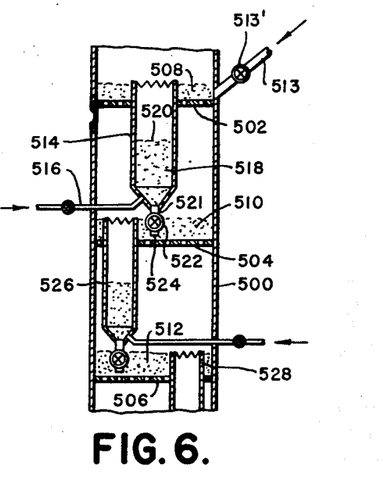
Fig. 6 is a vertical cross sectional view of a part of a modification of the stripping tower shown in Fig. 5.

In Fig. 6 a section of another stripping tower is shown which is similar to that shown in Fig. 5 with the exception that a valve is used in the lower outlet end of the de-aeration chamber to control the rate of withdrawal of particles therefrom. Instead of a valve, a fixed orifice of proper size may be used. The stripping tower 500 is provided with perforated partitions 502, 504 and 506, having thereon fluidized beds of solids 508, 510 and 512, respectively. An inlet line 513 having valve 513' is shown for introducing solids onto plate 502.

Extending upwardly through the center portion of plate 502 is an internal de-aeration chamber 514 having an open upper end which determines the level of the bed or mixture of solid particles on top plate 502. Aeration gas is introduced into the lower part of the chamber 514 through line 516 to maintain the particles as a dense fluidized mass shown at 518 with a level at 520. The outlet end 521 of the chamber 514 is necked down and provided with a valve 522 to control the rate of withdrawal of solids from the chamber 514. This flow is regulated to hold the bed level 520 at the desired point. The outlet end 524 extends below the level of fluidized solids shown at 510 on plate 504.

Another internal de-aeration chamber is shown at 526 having its upper end extending above plate 504 and its lower end opening into the dense fluidized bed 512 on the next lower plate 506. A portion of another de-aeration chamber is shown in 528.

The stripping towers shown in Figs. 5 and 6 function substantially the same as those shown in Figs. 3 and 4, i. e., the solid particles are passed through de-aeration and aeration chambers in succession so that the fluidized mixtures have their densities increased and decreased in different steps to facilitate stripping volatile material from admixture with solid contact or catalyst particles. In Figs. 3 and 4 the de-aeration high density zones are located outside of the stripping tower whereas in Figs. 5 and 6 these de-aeration heavy density zones or chambers are arranged within the stripping tower.

It will be noted that in Figs. 1 and 2 separate streams of fresh stripping gas are introduced to each stage, whereby maximum stripping is accomplished for a given amount of equipment. In Figs. 3, 4, 5 and 6 the stripping gas is supplied from a latter stage so that the flow of gas and solids to be stripped is countercurrent. The latter type of operation results in more complete stripping for a given stripping gas rate, or conversely reduces the stripping gas required to accomplish a given degree of stripping.

In all of the above forms of my invention while I have described a certain number of stages in the stripping operation, it is to be understood that the number of stages may be varied and a greater or less number used. Moreover, the initial and final stages may be taken as aeration or de-aeration stages as is most suited for the particular application.

In designing the various stripping zones sufficient bed depth should be provided to insure good contacting between the solids and stripping gas; for example, a bed depth of 1 to 5 feet may be used. The dilute phase, that is, the distance between the bed level in a high velocity stripping zone and the perforated plate or outlet line above this level, should be not less than 3 feet at 0.5 ft. per second or 5 feet at 1.5 ft. per second velocity of stripping gas. In the de-aeration vessels this distance may be 1 to 3 feet or more.

Sufficient time should be allowed in the de-aeration zones to accomplish the required degree of concentration. This can be determined by a simple settling experiment but will normally be 5 to 60 seconds, and should be held to a low value so as to avoid excessive cracking of entrained hydrocarbons. In processes using my invention where the entrained material is not further acted on by the catalyst, it may not be necessary to minimize the holding time in this zone. The time of residence of the particles in the less dense stripping zones may be about the same as in the de-aeration zones, but may be longer or shorter, as desired or necessary.

When using my invention in stripping spent cracking catalyst there will be a small amount of cracking of hydrocarbon vapors associated with the large amount of catalyst at a relatively high temperature, but my invention is primarily concerned with stripping in stages and reducing the time of residence of the catalyst in the stages to obtain the least amount of cracking of the associated hydrocarbons. In this respect my invention is distinguished from that disclosed in the Ogorzaly Patent 2,391,336 granted December 18, 1945, wherein a soaking or secondary conversion stage is provided wherein the catalyst is maintained for a relatively long period to crack the associated hydrocarbons to gas and coke, the gas being then stripped out in another stripping stage.

Also it is to be noted that my invention is useful in processes where no further cracking or conversion takes place in the stripping stages, as for example, absorption of desired gases from gaseous mixtures and then stripping according to my invention. In this respect my invention also distinguishes from that disclosed in said Ogorzaly patent.

While the invention has been specifically described in connection with the catalytic conversion of hydrocarbons, it may be used in other processes, as for example, absorption, chemical synthesis, and other processes which are carried out in stages.

While several forms of apparatus have been disclosed in connection with my invention, it is to be understood that these are by way of example only and various changes and modifications may be made without departing from the spirit of my invention.

I claim:

1. In a process for contacting finely divided solids and gaseous fluids wherein the solids are maintained in a dense fluidized condition in a treating zone and gaseous or volatile material is associated with the solids and a dense fluidized mixture of particles containing entrained gaseous or volatile material is withdrawn from the lower portion of the treating zone, the steps of stripping solids which comprise passing the withdrawn fluidized mixture into an initial stripping zone wherein the mixture is partly de-aerated to a denser fluidized condition than that existing in the treating zone while passing stripping gas upwardly therethrough to expel some of the entrained volatile material from admixture with the particles, passing the denser mixture from the initial stripping zone to a second stripping zone in which the particles are stripped while in a less dense fluidized mixture with an upflowing stripping gas and then passing the less dense fluidized mixture from the second stripping zone to a third stripping zone wherein the mixture is partly de-aerated and the particles are maintained in a denser fluidized condition than that existing in the previous stripping zone while passing a stripping gas upwardly therethrough, withdrawing stripped solids from the third stripping zone and withdrawing stripping gas and volatile material from the upper portion of each zone, the velocity of the upwardly flowing stripping gas in each of said stripping zones being selected to maintain a dense fluidified mixture superimposed by a dilute phase.

2. A process according to claim 1 wherein the velocity of the upflowing gas in said initial stripping zone is about 0.02 to 0.5 ft. per second and the velocity of the upflowing gas in said second stripping zone is about 0.5 to 2.0 ft. per second.

3. A process according to claim 1 wherein there is a dilute phase above each dense mixture in each stripping zone and the stripping gas flows upwardly through said stripping zones countercurrently to the flow of solids and with proper pressure maintained in each stripping zone by means of a balance line connecting into the dilute phase of the preceding stripping zone.

4. In a process for contacting finely divided solids and gaseous fluids wherein the solids are maintained in a dense fluidized condition in a treating zone and volatile material is associated with the solids and a dense fluidized mixture of particles containing entrained volatile material is withdrawn from the treating zone, the steps of removing volatile material from the solids which comprise passing the withdrawn fluidized mixture into a stripping zone wherein the mixture is aerated by passing a stripping gas upwardly therethrough, then passing the aerated fluidized mixture into a concentrating and stripping zone wherein the mixture is partly de-aerated to a denser fluidized condition than that existing in the stripping zone while passing stripping gas upwardly therethrough to expel some of the entrained volatile material from admixture with the particles, then passing the denser fluidized mixture from the concentrating and stripping zone to another stripping zone in which the particles are stripped while in a less dense mixture with an upwardly flowing stripping gas and then passing the less dense fluidized mixture from the last-mentioned stripping zone to another concentrating and stripping zone wherein the mixture is partly de-aerated and the particles are maintained in a denser fluidized condition than that existing in the second mentioned stripping zone while passing stripping gas upwardly therethrough, withdrawing stripped solids from the last-mentioned concentrating and stripping zone and withdrawing stripping gas and volatile material from the upper portion of each zone, the velocity of the upflowing stripping gas in each of said stripping zones being selected to maintain a dense fluidized mixture superimposed by a dilute phase.

5. In a process for contacting finely divided solids and gaseous fluids wherein the solids are maintained in a dense fluidized condition in a treating zone and volatile material is associated with the solids and a dense fluidized mixture of particles containing entrained volatile material is withdrawn from the treating zone, the steps which comprise passing the withdrawn fluidized mixture into an initial stripping zone wherein the mixture is at least partly de-aerated to a denser fluidized condition than that existing in the treating zone while passing stripping gas upwardly therethrough to expel some of the entrained volatile material from admixture with the particles, overflowing the denser mixture from the initial stripping zone into a second stripping zone in which the particles are stripped while in a less dense mixture with an upflowing stripping gas and then overflowing the less dense fluidized mixture from the second stripping zone to a third zone wherein the mixture is at least partly de-aerated and the particles are maintained in a denser fluidized condition than that existing in the second stripping zone while passing stripping gas upwardly therethrough, withdrawing stripped solids from said third zone and withdrawing stripping gas and volatile material from the upper portion of each zone, the velocity of the stripping gas in each of said stripping zones being selected to maintain a dense fluidized mixture superimposed by a dilute phase.

6. In a process for contacting finely divided catalyst and hydrocarbons wherein the catalyst particles are maintained in a dry dense fluidized liquid-simulating turbulent condition in a conversion zone, the particles become spent and hydrocarbon vapors are associated with the spent catalyst particles and a dense fluidized mixture of spent catalyst particles containing entrained vapors is withdrawn from said conversion zone, the steps of stripping spent catalyst which comprises passing the withdrawn dense fluidized mixture into an initial stripping and concentrating zone wherein the mixture is at least partly de-aerated and the particles are maintained in a denser fluidized condition but less turbulent condition than that existing in said conversion zone while passing a stripping gas upwardly therethrough to expel some of the entrained vapors from admixture with the particles, passing the particles as a fluidized mixture from the high density stripping zone to a second stripping zone in which the particles are stripped in a less dense condition with an upflowing gas and then passing the particles as a less dense fluidized mixture from the second stripping zone to a third stripping zone wherein the particles are maintained in a denser fluidized but less turbulent condition than that existing in said conversion zone while passing a stripping gas upwardly therethrough, withdrawing stripped particles from the third stripping zone and withdrawing stripping gas and vapors from the upper portion of each stripping zone, the velocity of the stripping gas in each of said stripping zones being selected to maintain a dense fluidized mixture superimposed by a dilute phase.

7. In a process for contacting finely divided catalyst and hydrocarbons wherein the catalyst particles become spent while being maintained in a dry dense fluidized liquid-simulating turbulent condition in a conversion zone and hydrocarbon vapors are associated with the catalyst particles and a dense fluidized mixture of spent catalyst particles containing entrained vapors is withdrawn from the lower portion of said conversion zone, the steps of stripping the catalyst which comprise passing the withdrawn mixture into an initial stripping and de-aeration zone wherein the fluidized mixture is at least partly de-aerated and the particles are maintained in a denser fluidized condition than that existing in said conversion zone while passing stripping gas upwardly therethrough to expel some of the entrained vapors from admixture with the particles, passing the particles as a fluidized mixture from the initial stripping zone to a second stripping zone in which the particles are stripped in a less dense condition with an upflowing stripping gas, then passing the particles as a less dense fluidized mixture from the second stripping zone to a third stripping zone wherein the particles are maintained in a denser fluidized condition than that existing in said second stripping zone while passing stripping gas upwardly therethrough, passing stripped particles from said third stripping zone to a fourth stripping zone in which the particles are maintained in a less dense mixture while being stripped with an upflowing stripping gas, withdrawing stripped catalyst from the fourth stripping zone and withdrawing stripping gas and vapors from the upper portion of each stripping zone, velocity of the stripping gas in each of said stripping zones being selected to maintain a dense fluidized mixture superimposed by a dilute phase.

8. In a process for contacting finely divided solids and gaseous fluid wherein the solids are maintained in a dense fluidized condition in a treating zone and gaseous fluid is associated with the solids and fluidized solids are withdrawn from said treating zone, the steps of stripping the solids with upflowing gas in a plurality of stages of different density mixtures to remove entrained gaseous fluid, which comprise passing a fluidized mixture through a plurality of successive stages wherein the fluidized mixture in passing through said stages is maintained at different densities with alternate stages being de-aeration stages wherein the dense mixture is at least partially de-aerated to form a more dense fluidized mixture than is maintained in the other alternate less dense stages, the velocity of the stripping gas in each of said stages being selected to maintain a dense fluidized mixture superimposed by a dilute phase.

9. A process according to claim 8 wherein the first stage is a de-aeration stage.

10. A process according to claim 8 in which the first stage is an aeration stage wherein the fluidized solids mixture is less dense than in the de-aeration stage.

11. A process according to claim 8 wherein the holding time in each de-aeration stage is not less than about 5 seconds.

12. A process according to claim 8 wherein the velocity of the upflowing stripping gas in each of the high density stages is from about 0.02 to about 0.5 ft. per second and the velocity of the upflowing stripping gas in each of the low density stages is from about 0.5 to about 2.0 ft. per second.

13. In a process wherein finely divided solids and gaseous fluid are contacted in a treating zone and solids having volatile material associated with the solids are withdrawn from said treating zone, the steps of stripping solids in a plurality of successive stages of different density mixtures to remove entrained volatile material with an upflowing stripping gas in each stage and with the velocity of the stripping gas being selected in each stage to maintain a dense fluidized mixture superimposed by a dilute phase in each of said stages which comprise passing a fluidized mixture through a plurality of successive stages by overflowing from one stage to the next stage and so that the fluidized mixture in passing through said stages is maintained at different densities in different stages with alternate stages being de-aeration stages wherein the dense fluidized mixture is at least partially de-aerated to form a more dense fluidized mixture than is maintained in the other alternate less dense stages and removing stripped solids from the last stage.

14. A stripping tower including a cylindrical vessel provided with a top outlet for gas, a bottom inlet for gas, a bottom outlet for solids and a top inlet for solids, horizontal perforated partitions spaced one above the other in said vessel and adapted to support fluidized beds of solids maintained in an aerated condition by upwardly flowing gas introduced through said inlet, a separate chamber arranged outside said vessel adjacent each of the perforated partitions except the lowermost one, an inclined pipe connected to each chamber and the cylindrical vessel for conducting solids from immediately above each perforated partition into the adjoining separate chamber, a vent pipe in the top of each of said chambers for the discharge of gas therefrom, an outlet line in the bottom of each of said chambers for the discharge of solids therefrom, each of said outlet lines connecting the bottom of a chamber to said cylindrical vessel and arranged to conduct the solid materials from the bottom of a chamber into the space just above the next lower perforated partition in said vessel and means for fluidizing solids in each of said chambers 15. A stripping tower as defined in claim 14 wherein the vent pipe in the top of each chamber is connected to the cylindrical vessel above the adjacent perforated partition for discharge of gas from each chamber above the fluidized bed of solids maintained on the adjoining perforated partition.

CHARLES E. JAHNIG.

REFERENCES CITED

The following references are of record in the file of this patent:

UNITED STATES PATENTS

| Number | Name | Date |
|---|---|---|
| 2,367,694 | Snuggs | Jan. 23, 1945 |
| 2,391,336 | Ogorzaly | Dec. 18, 1945 |
| 2,391,944 | Carlsmith | Jan. 1, 1946 |
| 2,399,050 | Martin | Apr. 23, 1946 |
| 2,414,002 | Thomas et al. | Jan. 7, 1947 |
| 2,422,793 | McAfee | June 24, 1947 |